United States Patent
Peters

(10) Patent No.: US 9,760,367 B2
(45) Date of Patent: Sep. 12, 2017

(54) METHOD FOR RECONFIGURING SOFTWARE PARAMETERS IN A MICROCONTROLLER AS WELL AS A MICROCONTROLLER AND CONTROL UNIT

(75) Inventor: Matthias Peters, Abstatt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 91 days.

(21) Appl. No.: 13/814,355

(22) PCT Filed: Jul. 15, 2011

(86) PCT No.: PCT/EP2011/062144
§ 371 (c)(1),
(2), (4) Date: Apr. 9, 2013

(87) PCT Pub. No.: WO2012/016805
PCT Pub. Date: Feb. 9, 2012

(65) Prior Publication Data
US 2013/0191819 A1 Jul. 25, 2013

(30) Foreign Application Priority Data

Aug. 6, 2010 (DE) ........................ 10 2010 039 021

(51) Int. Cl.
*G06F 9/445* (2006.01)
*G06F 9/32* (2006.01)
*G06F 9/44* (2006.01)

(52) U.S. Cl.
CPC .................. *G06F 8/66* (2013.01); *G06F 8/60* (2013.01); *G06F 8/65* (2013.01); *G06F 8/68* (2013.01); *G06F 9/328* (2013.01)

(58) Field of Classification Search
CPC ..... G06F 8/65; G06F 8/66; G06F 8/60; G06F 12/0638; G06F 9/328

(Continued)

(56) References Cited

U.S. PATENT DOCUMENTS 5,184,214 A 2/1993 Tatsumi
6,463,549 B1 * 10/2002 Shperber et al. ............ 714/6.32
(Continued)

FOREIGN PATENT DOCUMENTS

CN 1692330 A 11/2005
CN 101212689 A 7/2008
(Continued)

OTHER PUBLICATIONS

International Search Report for PCT/EP2011/062144, dated Sep. 12, 2011.

*Primary Examiner* — Lewis A Bullock, Jr.
*Assistant Examiner* — Jacob Dascomb
(74) *Attorney, Agent, or Firm* — Norton Rose Fulbright US LLP; Gerard Messina

(57) ABSTRACT

In a method for reconfiguring software parameters in a microcontroller having at least one computing unit, a first non-volatile read-only memory and a volatile memory, which software parameters are stored in the first non-volatile read-only memory, reconfiguration information concerning software parameters to be modified and at least one correction value are transferred from a second non-volatile read-only memory assigned to the microcontroller into the volatile memory. At least one software parameter is transferred from the first non-volatile read-only memory into the volatile memory for processing by the computing unit. If the software parameter transferred into the volatile memory matches one of the software parameters to be modified, the value of the software parameter transferred into the volatile memory is replaced by a correction value before processing.

13 Claims, 5 Drawing Sheets

(58) Field of Classification Search
USPC .......................................... 717/168–173, 165
See application file for complete search history.

(56) References Cited

U.S. PATENT DOCUMENTS

| | | | |
|---|---|---|---|
| 7,103,736 B2* | 9/2006 | Sachs | 711/159 |
| 7,302,605 B2* | 11/2007 | Goodnow | 714/6.13 |
| 7,502,353 B2* | 3/2009 | Bolz | 370/338 |
| 7,694,046 B2* | 4/2010 | Howard et al. | 710/62 |
| 2001/0013091 A1* | 8/2001 | Koschella et al. | 711/165 |
| 2003/0084229 A1* | 5/2003 | Ho et al. | 711/102 |
| 2004/0103412 A1* | 5/2004 | Rao et al. | 717/171 |
| 2005/0017851 A1 | 1/2005 | Allison | |
| 2005/0097540 A1* | 5/2005 | Matsumoto et al. | 717/168 |
| 2008/0155527 A1* | 6/2008 | Lantz et al. | 717/171 |
| 2009/0013124 A1* | 1/2009 | Itkin | G06F 9/32 |
| | | | 711/103 |

FOREIGN PATENT DOCUMENTS

| | | |
|---|---|---|
| CN | 101624052 A | 1/2010 |
| DE | 102 60 103 | 7/2004 |
| GB | 2 227 584 | 8/1990 |

\* cited by examiner

METHOD FOR RECONFIGURING SOFTWARE PARAMETERS IN A MICROCONTROLLER AS WELL AS A MICROCONTROLLER AND CONTROL UNIT

BACKGROUND OF THE INVENTION

1. Field of the Invention

The present invention relates to a method for reconfiguring software parameters in a microcontroller as well as a microcontroller and a control unit for this purpose.

2. Description of the Related Art

The reconfiguration of software, in particular of free parameters, in a microcontroller often represents a major logistical challenge. For example, in the case of microcontrollers, which are used in a vehicle control unit, a necessary reconfiguration may involve time and effort of several days. To this end, it may be necessary to redesign and test the software, deliver it to a customer and then reprogram the vehicle or the associated microcontroller in one of its control units in a reprogramming station. Such a reconfiguration, however, is not only of interest to a customer, but also, for example, when testing the software. Often a laboratory for testing does not have fully adequate surroundings, making it, e.g., necessary to deactivate certain monitoring functions. In the use case "microcontroller in the vehicle," it might be possible, for example, for the application programmer to quickly trigger a logic change/monitoring deactivation in order to check the vehicle's behavior in other situations. For reconfiguring software in microcontrollers, in particular in the context described, two methods are presently known: on the one hand, the modification of the entire software code, its compilation and subsequent flashing; on the other hand, the modification of individual software parameters which may be flashed individually in the software, compilation and subsequent partial flashing.

A method for reconfiguring control unit software is known from published German patent application document DE 102 60 103 A1. In this case, the design of old software components is replaced by the design of new software components, the new software components being written into a second memory area, and the new software components are designed instead of the old ones as the result of branching. This method also entails the aforementioned logistical complexity of having to modify and rewrite an entire software program or an entire software section.

BRIEF SUMMARY OF THE INVENTION

In contrast, the present invention has the advantage that parameters may be modified during run time via the use of an additional non-volatile memory, and this makes it possible to respond to customer requests, for example, very quickly. Furthermore, a large number of parameters, not only those defined for this purpose in particular, may be modified. Apart from the reduced logistical complexity, a less error-prone reconfiguration is provided accompanied by significantly reduced new development efforts. For the purpose of reconfiguration, it is not necessary to load a whole set of parameters into the non-volatile memory, but instead only the single parameters that are to be modified. This has the advantage that the use of the non-volatile memory is very low and is zero in the normal case, even in the case of necessary reconfigurations or corrections.

Furthermore, software attributes/logics (such as a new type of calculation, for example, addition instead of subtraction), which are normally not parameterized, are also advantageously changeable, since they would simply exceed the number of parameters to be provided when a parameter set approach is used.

It is in particular advantageous to store the software parameters, which belong to one block, for example, to one signal in the signal processing, together, in particular in tabular form, to transfer them together into the volatile memory for processing and, if necessary, also process them there in tabular form. Here, the reconfiguration information loaded into the volatile memory may also be investigated in a signal-specific manner: "Is a change request present for the signal whose software parameters are just now stored in the volatile memory?" The advantage of such storage or processing is the high efficiency, which has a positive effect on the controllability of the method and the speed of the operations. In principle, the described approach should, however, not be limited to the signal processing, but instead is similarly applicable to the processing of any data, for which the particular software logics and parameters are processed cyclically.

In one advantageous embodiment, the reconfiguration information and the correction values for the parameters to be modified, which are listed in the reconfiguration information, are transferred from the non-volatile read-only memory into the volatile memory at particular times, for example, at every microcontroller start or at the start of a higher-level system. Thus, the time demands on the software processing caused by the reconfiguration will remain minimal.

The reconfiguration information and the correction values for the parameters to be modified listed in the reconfiguration information may in each case be written as needed into the non-volatile read-only memory or modified, i.e., updated, in it. This operation may be implemented, for example, by a CAN sequence if the non-volatile read-only memory has a CAN bus connection. The advantage of such an approach, in particular in the preferred exemplary embodiment of a microcontroller in a vehicle control unit, is that the CAN bus represents a standard access and the use of a CAN sequence makes a reconfiguration possible which is as standardized as possible and simple to implement.

It is in particular advantageous that the present invention may be used when the microcontroller is integrated into a control unit in a vehicle. Due to the often very large number of possible parameters in this use case and due to high safety regulations and often changing general conditions, a fast and reliable reconfiguration of software parameters is of particular importance in this case.

DETAILED DESCRIPTION OF THE INVENTION

In the following, the present invention will be described in greater detail with reference to drawings for the example of the software or software parameter reconfiguration of a microcontroller in a control unit, in particular in a vehicle control unit. However, the present invention is not limited to this use, but may instead be used for any microcontrollers.

Figure 1:
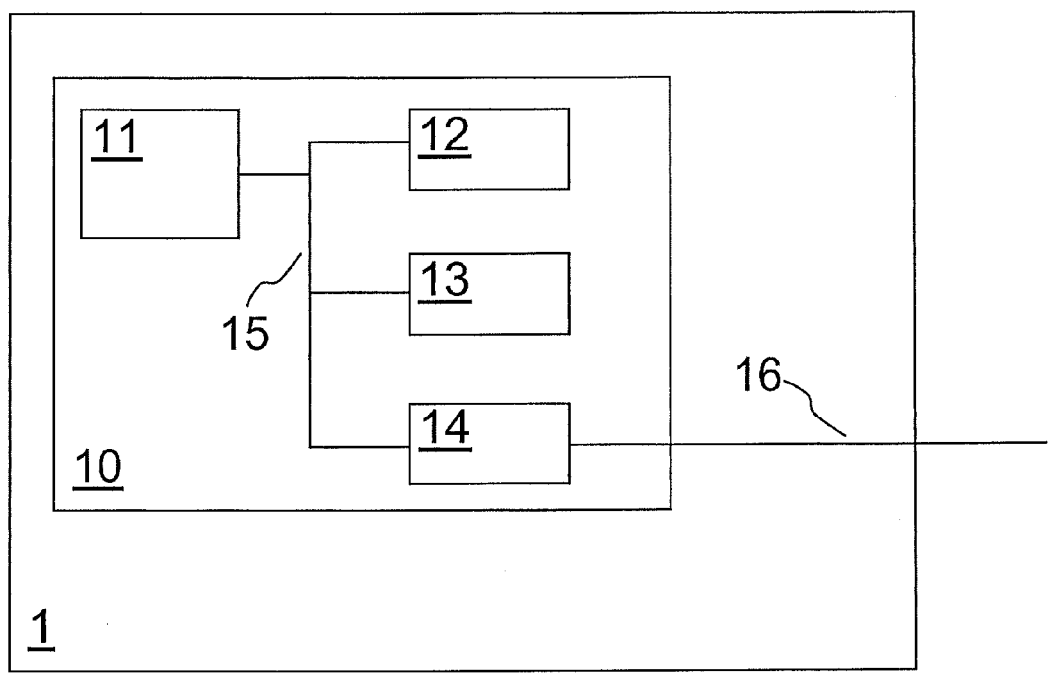
FIG. 1 shows a first, schematic representation of a control unit having a microcontroller.
Figure 2:
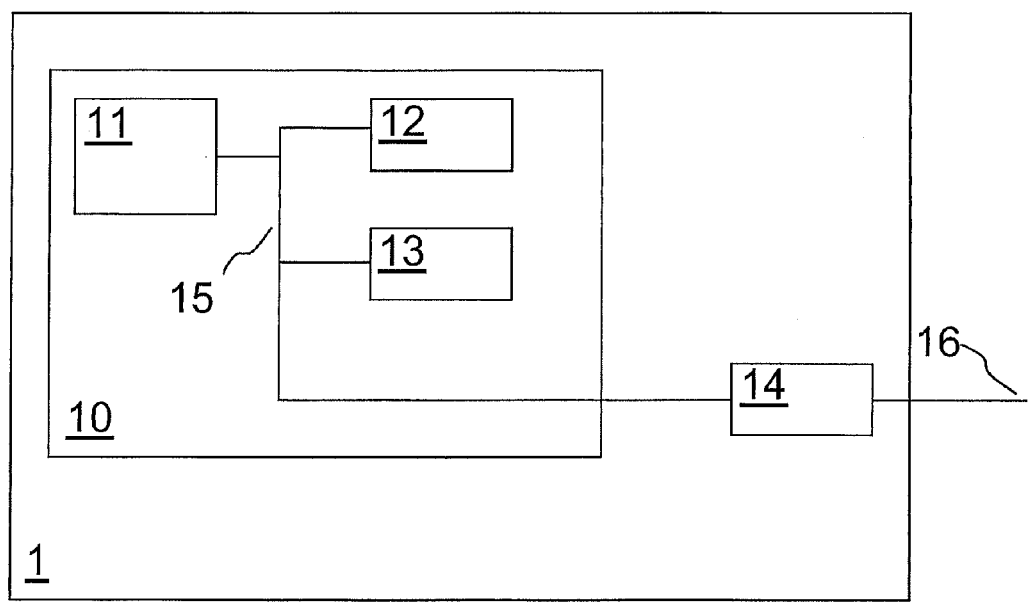
FIG. 2 shows a second, schematic representation of a control unit having a microcontroller.
Figure 3:
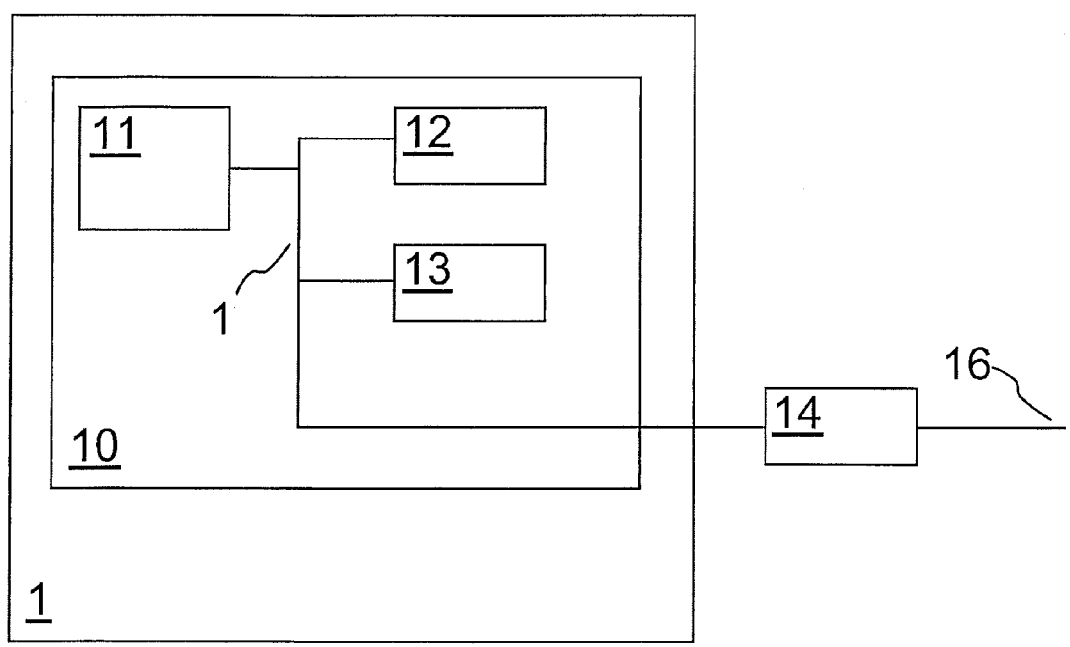
FIG. 3 shows a third, schematic representation of a control unit having a microcontroller.
Figure 4:
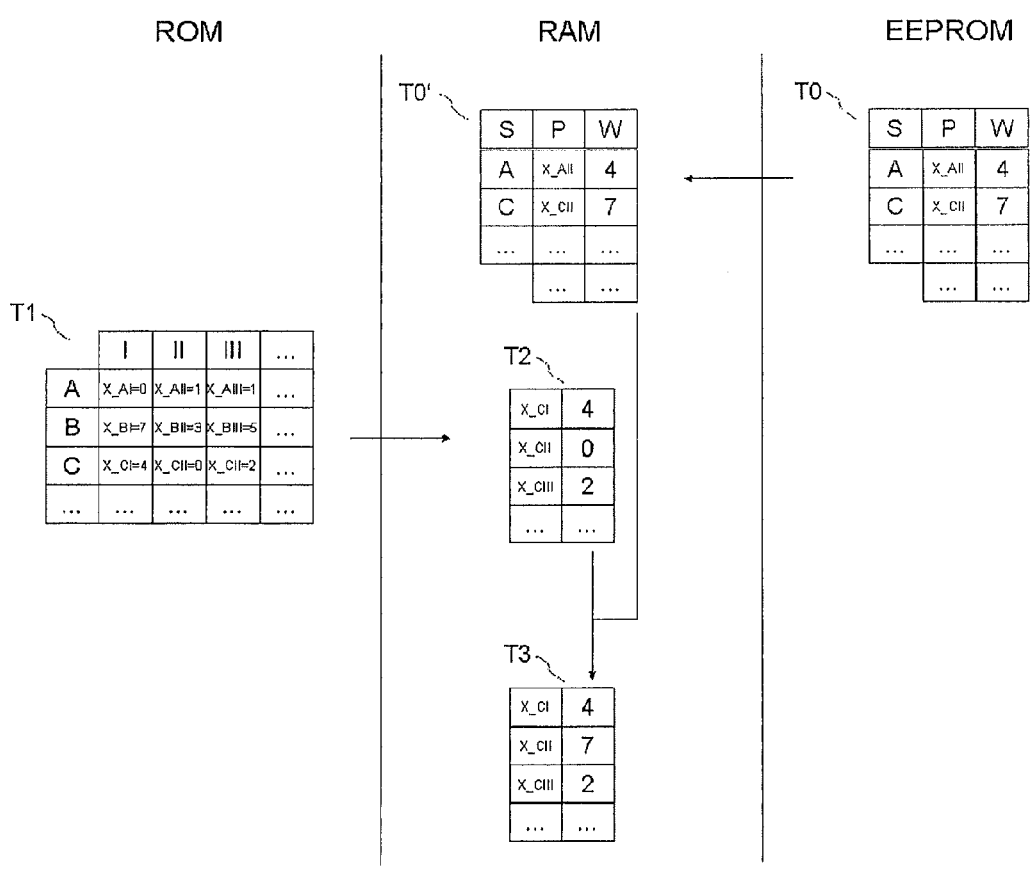
FIG. 4 shows a schematic example of a parameter reconfiguration.

FIGS. 1 through 3 each show as an example a schematic representation of a control unit having a microcontroller, which is suitable for the software configuration according to the present invention. Here, identical reference numerals denote identical or comparable units in each case. Among other things, control units 1 have in each case a microcontroller 10; additional hardware components or interfaces of the control unit are not shown in this illustration for the sake of clarity. Microcontroller 10 has at least one computing unit, or at least one computation module 11, as well as a first, non-volatile read-only memory 12 (e.g., ROM) and a volatile memory 13 (e.g., RAM). Moreover, a second, non-volatile read-only memory 14 (e.g., EEPROM) is provided, which may be situated in microcontroller 10 (FIG. 1), outside of microcontroller 10, but within control unit 1 (FIG. 2) or also externally to the control unit (FIG. 3). Computing unit 11 and memories 12, 13, 14 have communication links among one another (e.g., serial ports, or shared bus system), which are indicated in FIGS. 1 through 3 as communication links 15. Departing from shown connection structure 15, other communication paths may also be provided. Second, non-volatile read-only memory 14 has an additional communication link 16 in FIGS. 1 through 3, for example, a CAN line or K-line communication link external to the control unit. However, non-volatile memory 14 need not necessarily have a separate interface, e.g., to the CAN bus. Also sufficient is a connection of the microcontroller to the CAN, which may in turn describe the non-volatile memory (e.g., during a diagnostic session via CAN).

Referring to FIGS. 1 through 3, FIG. 4 shows a schematic example of a software parameter reconfiguration. Here, tables T0, T0', T1, T2 and T3 are shown, which are or will be stored in a first, non-volatile read-only memory ROM (corresponding to memory 12 in FIGS. 1 through 3), a volatile memory RAM (corresponding to memory 13 in FIGS. 1 through 3) and a second, non-volatile read-only memory EEPROM (corresponding to memory 14 in FIGS. 1 through 3). First table T0 has a first column, signal column S, in which signals A, C, . . . are listed, for which software parameters are to be modified in microcontroller 11.

Signals are in particular described as messages having particular value information received from sensors, from actuators or from control units, commands, or other information for a diagnosis, for further processing, as the basis for a control, etc.

In the second column, parameter column P, the software parameters are stored, which are to be modified or reconfigured in the microcontroller.

(Modifiable) parameters may, for example, relate to: activating or deactivating diagnostic functions, properly obtaining a particular communication framework, limiting signal values, error words assigned to a particular signal error, monitoring/variant classes, invalid or undefined value, signal class, calculation variables (factors, offsets . . . ) etc.

The software parameters of column P in Table T0 are each assigned to a signal from column S. This assignment corresponds to the assignment of the parameters in Table T1 as well, as described further below. In the third column of table T0, value column W, the new parameter values are listed, i.e., the correction values, for the software parameters to be modified. In the example shown, only one parameter X_AII to be modified is present for signal A, which is to be assigned the new value of 4. No software parameter to be modified is present for signal B. For signal C, software parameter X_CII to be modified is present, which is to be assigned the new value of 7. Of course, for the sake of simplicity, any information may be assigned to the correction and parameter values which are listed in this figure as numerical values. Table 0 will now be transferred from second, non-volatile read-only memory EEPROM as table 0' to volatile memory RAM. As will be explained later, this transfer may be made in an advantageous embodiment, when the microcontroller is started (or when a control unit or vehicle is started, if the microcontroller is used in this area).

Table T1 is stored in first, non-volatile read-only memory ROM. In this table T1, signals A, B, C, . . . to be processed or to be monitored by microcontroller 10 are listed in the first column, and the parameters to be assigned to these signals are listed in columns I, II, III, . . . . Here, all possible parameters, for which a necessary reconfiguration in the future is conceivable, should appear as free parameters in this table, because only these parameters or their values may be modified using the software configuration according to the present invention. For the sake of clarity, parameters X_AI, X_AII . . . together with their particular values (0, 1, etc.) are indicated in a shared table field in table T1.

In a preferred exemplary embodiment, signals A, B, C, . . . are cyclically processed or monitored by microcontroller 10, in that table T1 is transferred into volatile memory RAM line by line, i.e., for one signal in each case (signal C in FIG. 4), for further processing as table T2. Before further processing, however, it is checked whether a change request is present in table T0' for table T2, i.e., in FIG. 4 for signal C. In the example shown, parameter X_CII to be modified for table T2, i.e., signal C, is present in Table T0'. This parameter was originally configured to have value X_CII=0 and thus assumes this value in tables T1 and T2. The correction value from table T0 or table T0' is 7. In the following, before signal C is processed by microcontroller 10 using parameters X_CI, X_CII, X_CIII . . . in volatile memory RAM, the value of the parameter to be modified is corrected (in this case from 0 to 7), and accordingly table T2 is corrected to table T3. Only then is signal C processed according to the parameters of Table T3 in volatile memory RAM. The software is designed in such a way that the parameters may be processed in turn on a table by table basis. In the case of multiple correction requests for a signal, all parameter values to be corrected are corrected in succession, before the signal processing takes place. If no change requests are present in table T0' for the signal, whose assigned parameters are currently loaded in RAM as table T2 (as would be the case in the example for signal B), the signal processing may take place directly.

Figure 5:
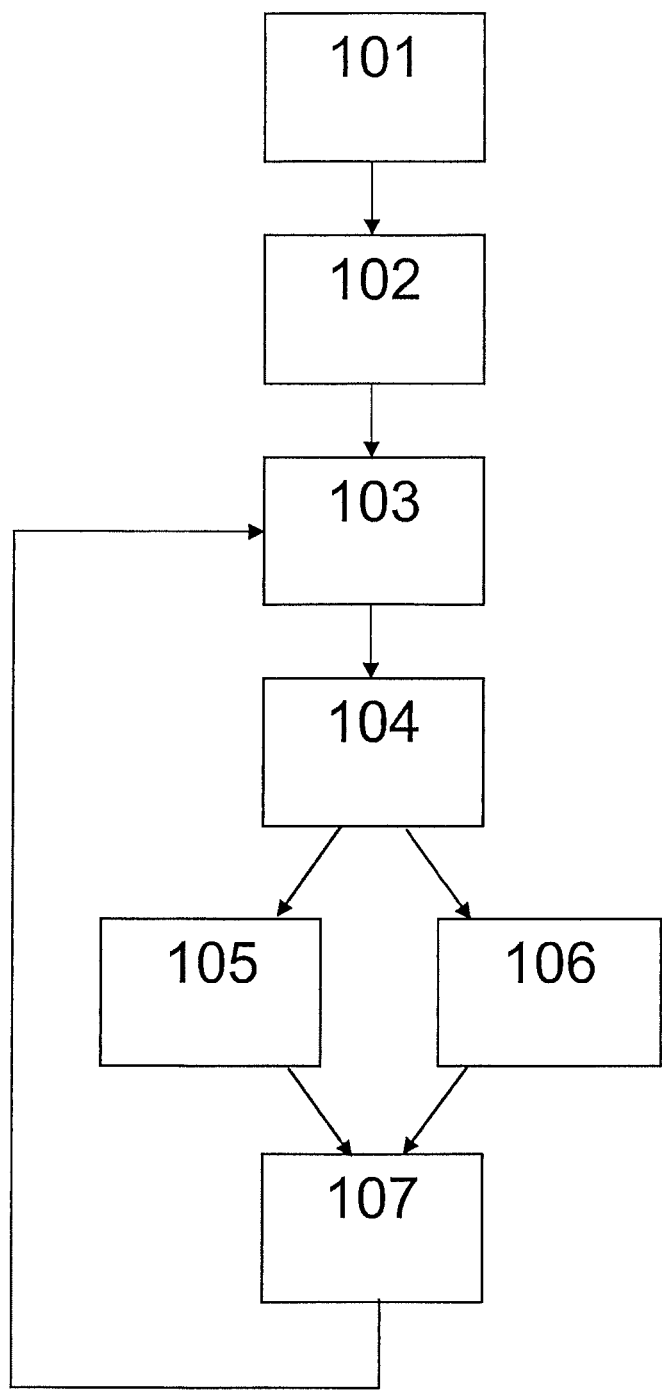
FIG. 5 shows an exemplary sequence of a method for a parameter configuration.

FIG. 5 shows an exemplary sequence of a method for a parameter configuration. The core method includes steps 102 through 108.

In step 101, a table T0 is created having information concerning software parameters of a control device to be modified or to be reconfigured, as well as the corresponding correction values, and stored in a non-volatile read-only memory EEPROM. The access to EEPROM is made, e.g., via diagnostic interfaces, preferably via standard diagnostic accesses such as a CAN connection or K-Line. The memory may be reconfigured or reprogrammed via an external tool, e.g., using simple standard hardware having a CAN card via a CAN sequence.

In step 102, in a preferred embodiment, for example, triggered by a microcontroller start, table T0 is copied from memory EEPROM into volatile memory RAM.

In a next step 103, the portion of table T1 which contains the parameters of a particular signal is copied from a second table T1, which is stored in non-volatile read-only memory ROM, and which lists all parameters including values for the signals processed by the microcontroller. This portion is stored as table T2 in volatile memory RAM.

In step 104, table T0' is checked whether a change request is present or whether multiple change requests are present for the signal whose parameters are stored in table T2 in memory RAM. Since the information concerning the signal to which the changes refer is stored in the EEPROM reconfiguration table for the changes, it may be quickly checked whether a change request is present for this signal after parameters of a signal are loaded into RAM. If a change request is present, the value of the parameter to be modified in table T2 is replaced by the corresponding correction value from table T0' in step 105, and thus table T2 is corrected to table T3. The same occurs when there are multiple parameter values to be modified.

If no change request is present for the signal in question, branching is made to step 106 in which no reconfiguration activity takes place. In step 107, which follows alternative steps 105 and 106, the signal corresponding to table T3 is processed or controlled by the microcontroller based on the parameter values stored in table T3. A branching is then made to step 103. Here, the corresponding portion of table T1 is in turn transferred as table T2 from memory ROM into memory RAM for the next provided signal in the processing sequence of the signals. The method then proceeds further as described.

If new reconfiguration information and correction values become necessary, the method is restarted (by overwriting of table T0 in memory EEPROM) in step 101. Even if no new reconfiguration information and correction values are needed, if the volatile memory was without supply, i.e., for example, in the case of a microcontroller restart, the method is at least restarted in step 102, since table 0' must be reloaded from non-volatile EEPROM memory into the volatile memory.

What is claimed is:

1. A method for reconfiguring software parameters in a microcontroller having at least one computing unit, a first non-volatile read-only memory, and a volatile memory, and the software parameters being stored in the first non-volatile read-only memory, comprising:
    transferring, using one or more signals, at least one software parameter from the first non-volatile read-only memory into the volatile memory for processing by the computing unit, wherein each of the at least one software parameter includes an initial value when transferred into the volatile memory and is associated with a respective one of the one or more signals;
    transferring one or more reconfiguration information sets from a second non-volatile read-only memory assigned to the microcontroller into the volatile memory, wherein each reconfiguration information set of the one or more reconfiguration information sets includes:
        a signal identifier corresponding to one of the one or more signals;
        a parameter identifier corresponding to one of the at least one software parameter; and
        a correction value;
    for each signal of the one or more signals, checking the each of the one or more reconfiguration information sets in the volatile memory to determine whether one or more of the at least one software parameter associated with a respective signal of the each signal matches a respective one of the parameter identifiers associated with a respective one of the reconfiguration information sets, and replacing the initial value of the at least one software parameter in the volatile memory with the respective correction value of any matching software parameter, which is to be modified; and
    cyclically processing the signals, wherein a checking of the reconfiguration information in the volatile memory to determine whether the at least one software parameter matches any of the software parameters to be modified is repeated for every cycle.

2. The method as recited in claim 1, wherein:
    the association of the one or more signals with the software parameters is for processing of the one or more signals in accordance with respective ones of the plurality of software parameters with which the one or more signals are respectively associated;
    the one or more reconfiguration information sets identify one or more of the plurality of software parameters and include a respective correction value for each of the identified one or more software parameters;
    the method includes, responsive to a software run time requiring whichever one or more of the plurality of software parameters that are associated with a particular one of the one or more signals to be transferred to the volatile memory in order for the computing unit to process the particular one of the one or more signals:
        transferring, during the software run time, from the first non-volatile read-only memory, and into the volatile memory, the one or more of the software parameters associated with the particular signal for processing by the computing unit of the one or more software parameters and the particular signal; and
        performing the checking and replacing steps;
    the checking step includes checking the reconfiguration information that had been transferred to the volatile memory to determine whether any of the one or more software parameters that had been transferred into the volatile memory during the software run time matches any of the software parameters identified by the reconfiguration information that had been transferred to the volatile memory;
    the replacing step includes replacing the initial value of any of the one or more software parameters in the volatile memory that had been determined to match any of the software parameters identified by the reconfiguration information that had been transferred to the volatile memory with the respective correction value of the matching software parameter identified by the reconfiguration information; and
    the cyclical processing of the signals includes, after the replacing, executing, by the computing element, software code to perform the processing of the particular signal and of the one or more software parameter in the volatile memory.

3. The method as recited in claim 2, wherein the one or more software parameters includes a plurality of software parameters assigned to a same selected signal to be further processed or checked by the microcontroller, wherein the plurality of software parameters assigned to the same selected signal are transferred together from the first non-volatile read-only memory into the volatile memory, and wherein each signal includes a message from one of a sensor, an actuator and a control unit.

4. The method as recited in claim 3, wherein the software parameters are stored in tabular form in the first non-volatile read-only memory, and wherein software parameters assigned to the same selected particular signal are grouped together in a table in the first non-volatile read-only memory.

5. The method as recited in claim 4, wherein the reconfiguration information for the software parameters assigned to the selected particular signal are checked to determine whether a software parameter to be modified is present for the selected particular signal.

6. The method as recited in claim 4, wherein the software parameters transferred into the volatile memory and assigned to the selected particular signal are processed in tabular form by the computing unit.

7. The method as recited in claim 3, wherein the reconfiguration information and the at least one correction value are transferred from the second non-volatile read-only memory into the volatile memory each time the microcontroller is started.

8. The method as recited in claim 7, wherein the reconfiguration information and the at least one correction value are stored in the second non-volatile read-only memory via a CAN sequence.

9. A microcontroller comprising:
a computing unit;
a first non-volatile read-only memory storing a plurality of software parameters;
a volatile memory; and
means for:
    transferring, using one or more signals, at least one of the software parameters from the first non-volatile read-only memory into the volatile memory for processing by the computing unit, wherein each of the at least one software parameter includes an initial value when transferred into the volatile memory and is associated with a respective one of the one or more signals;
    transferring one or more reconfiguration information sets from a second non-volatile read-only memory assigned to the microcontroller into the volatile memory, wherein each reconfiguration information set of the one or more reconfiguration information sets includes:
        a signal identifier corresponding to one of the one or more signals;
        a parameter identifier corresponding to one of the at least one software parameter; and
        a correction value; and
    for each signal of the one or more signals, checking the each of the one or more reconfiguration information sets in the volatile memory to determine whether one or more of the at least one software parameter associated with a respective signal of the each signal matches a respective one of the parameter identifiers associated with a respective one of the reconfiguration information sets, and replacing the initial value of the at least one software parameter in the volatile memory with the respective correction value of any matching software parameter, which is to be modified;
wherein the computing unit is configured to cyclically process the signals, with the checking being repeated for every cycle.

10. The microcontroller as recited in claim 9, wherein the volatile memory is a RAM, and the second, non-volatile read-only memory is an EEPROM.

11. The microcontroller as recited in claim 10, wherein the second, non-volatile read-only memory is part of the microcontroller.

12. The microcontroller as recited in claim 9, wherein the microcontroller is part of a control unit in a vehicle.

13. The microcontroller as recited in claim 12, wherein the second, non-volatile read-only memory is situated internal to the control unit and external to the microcontroller.

* * * * *